United States Patent [19]

Igarashi

[11] Patent Number: 4,774,550
[45] Date of Patent: Sep. 27, 1988

[54] IMAGE INFORMATION READING APPARATUS

[75] Inventor: Yosuke Igarashi, Yokohama, Japan

[73] Assignee: Kabushiki Kaisha Toshiba, Kawasaki, Japan

[21] Appl. No.: 929,803

[22] Filed: Nov. 12, 1986

Related U.S. Application Data

[62] Division of Ser. No. 832,572, Feb. 24, 1986, abandoned.

[30] Foreign Application Priority Data

Feb. 25, 1985 [JP] Japan .................................. 60-35670
Feb. 25, 1985 [JP] Japan .................................. 60-35673
Feb. 28, 1985 [JP] Japan ............................ 60-28435[U]

[51] Int. Cl.$^4$ ............................................ G03B 27/54
[52] U.S. Cl. .................................... 355/67; 313/493; 439/830
[58] Field of Search ...................... 355/68, 69, 67, 70, 355/113, 30; 339/252 F, 253 F, 258 F, 259 F, 262 F; 362/217; 313/484, 491, 493; 439/830-833

[56] References Cited

U.S. PATENT DOCUMENTS

| | | | |
|---|---|---|---|
| 2,247,117 | 6/1941 | Reamer | 362/217 X |
| 2,942,228 | 6/1960 | Swick | 439/831 |
| 3,592,538 | 7/1971 | Ukai | 355/30 |
| 3,637,303 | 1/1972 | Komori et al. | 355/8 |
| 3,779,640 | 12/1973 | Kidd | 355/30 |
| 3,802,102 | 4/1974 | Licciaroi | 355/113 |
| 3,993,406 | 11/1976 | Zeuthen | 355/8 |
| 4,071,883 | 1/1978 | Dennis | 355/113 |
| 4,082,444 | 4/1978 | Menon et al. | 355/67 X |
| 4,086,009 | 4/1978 | Gewirtz | 355/30 |
| 4,124,294 | 11/1978 | Nakamura | 355/68 |
| 4,195,249 | 3/1980 | Ariga et al. | 313/493 |
| 4,317,066 | 2/1982 | Hammond et al. | 313/493 |
| 4,429,602 | 1/1984 | Mollet et al. | 313/493 X |
| 4,463,284 | 7/1984 | Tamura et al. | 355/68 |
| 4,661,890 | 4/1987 | Watanabe et al. | 355/70 X |

FOREIGN PATENT DOCUMENTS 2856540 7/1979 Fed. Rep. of Germany .

OTHER PUBLICATIONS

Catalogue of Buerklin Die Ganze-Elektronik, 1980, pp. H85-H95, year 25.

Primary Examiner—Michael L. Gellner
Assistant Examiner—Brian W. Brown
Attorney, Agent, or Firm—Foley & Lardner, Schwartz, Jeffery, Schwaab, Mack, Blumenthal & Evans

[57] ABSTRACT

An image information reading apparatus for reading image information on an original placed on an original holding board with the use of light beam which is emitted from a light source to lighten the original. A box-shaped frame in which essential components constituting the apparatus are accommodated includes both side frames and an upper frame in the integral structure and moreover it is formed with a rectangular opening on the upper frame on which the original holding board is immovably placed. An image reading unit constituted by the combination of tubular light source, optical system and photoelectrical converter can be mounted and dismounted by turning the image reading unit by an angle of 90 degrees within the interior of the frame and then displacing it through the rectangular opening in the vertical direction, when dimensions of the rectangular opening are determined properly. The rectangular opening may be formed with a pair of cutouts in order that the tubular light source can be fitted and removed from the operative area located above the upper frame by displacing the light source in the vertical direction through the cutouts and the rectangular opening.

13 Claims, 13 Drawing Sheets

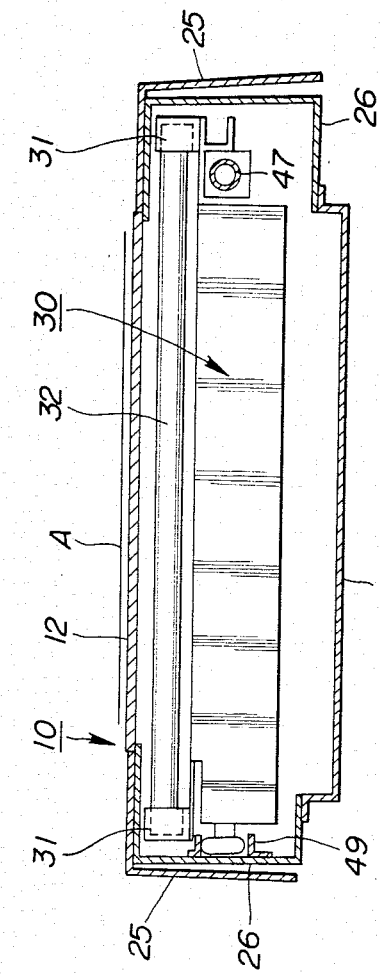

IMAGE INFORMATION READING APPARATUS

This application is a division of application Ser. No. 832,572, filed Feb. 24, 1986, now abandoned.

BACKGROUND OF THE INVENTION

1. Field of the Invention

The present invention relates to an image information reading apparatus adapted to read information on an original placed on an original holding board by reciprocatably displacing an image reading unit which comprises a light source, an optical system, photoelectrical conveying means and other components, wherein improvement is achieved for the purpose of facilitating operations of assembling, maintaining and inspecting and moreover controlling is properly effected for a cooling fan which is accommodated in the frame of the apparatus.

2. Description of the Prior Art

In the recent years, a thermal transfer type color copying machine for carrying out color copying with the use of a strip of thermal transfer ink ribbon having a plurality of color inks coated thereon has been increasingly put in practical use. The conventional color copying machine is generally constituted by the combination of an image information reading apparatus (scanner section) adapted to read information on an original and an image building section (printer section) for building an image on a sheet of paper in response to image information which has been transmitted from the image information reading apparatus. Specifically, the image information reading apparatus is so constructed that image information on the original placed on the original holding board is read as color signal of light beam by optically scanning the original and thus read image informatin is transmitted to the image building section. On the other hand, the image building section is so constructed that on receipt of image information transmitted from the image information reading apparatus it is converted to color information corresponding to each of inks on the thermal transfer ink ribbon, a corresponding ink section on the thermal transfer ink ribbon is selected in dependence on thus converted color information and ink on the selected ink section is thermally transferred to a sheet of paper by means of a thermal head whereby color copying is achieved by successively transferring plural colors to the paper one by one.

Recently, a variety of development works have been conducted in order to design the whole image information reading apparatus to be used for a thermal transfer type color copying machine in smaller dimensions so as to allow it to be easily carried and place on a table or the like by an operator himself.

To facilitate understanding of the present invention description will be made below as to the conventional apparatus with reference to FIGS. 1 to 3. As shown in FIG. 1, a frame 1 for the apparatus is constructed by the combination of an opposing pair of side frames 2 made of U-shaped extruded sheet material, a front frame 3 and rear frame 4 which are separately fabricated and then assembled in the illustrated integral structure. When an original holding glass plate 5 serving as original holding board is placed on the upper surface of the frame 1, its both side edges are supported on both the side frames 2 while extending therebetween. At this moment the horizontal posture of the glass plate 5 has a significant effect on accuracy of assembling operation of the frame 1. For the reason there is a necessity for correctly locating components constituting the apparatus when assembling the latter or adjusting the focussed state of an optical system in the apparatus after completion of assembling operation. This leads to a problem that assembling operation of the apparatus is complicated, troublesome and time-consuming.

Usually, a tubular light source, for instance, fluorescent lamp is hitherto employed as light source which is accommodated in the image information reading apparatus. When the fluorescent lamp 6 is to be fitted into an image reading unit 7 in the casing of the apparatus, it is inserted into the interior of the casing through a circular hole 8 which is formed on the one side frame 2 of the frame 1, as shown in FIG. 2. Namely, when the fluorescent lamp 6 is fitted into the unit 7, the conventional steps of operations are such that the glass plate 5 is first removed from the side frames 2, the fluorescent lamp 6 is inserted through the hole 8 and it is firmly supported in position in the frame 1 with the aid of operator's hands which are inserted through the rectangular opening on the upper surface of the frame 1. As is well known, brightness of the fluorescent lamp 6 varies across the whole length thereof in such a manner that it generates a reduced intensity of light at both the end parts and it does a normal intensity of light in the central part. For the reason, when a fluorescent lamp is employed for a color copying machine, only the central part thereof where a substantially uniform intensity of light is generated is utilized as an effective part with the exclusion of both the end parts in view of the fact that intensity of light generated by it and color balance have a significant effect on image building. For instance, it is assumed that a fluorescent lamp of which total length l is 304 mm and of which distance $l_0$ between both filaments is 288 mm is used for the apparatus, when an original having A4 size is scanned in the longitudinal direction. In this case the effective length $l_0$ is shorter than the distance $l_1$ between both the filaments.

For the reason the conventional apparatus is so designed that width $L_1$ of the rectangular opening on the upper surface of the frame 1 is determined substantially same to the effective length $l_0$ of the fluorescent lamp 6 and width $L_2$ of the image reading unit 7 is determined substantially same to the total length l of the fluorescent lamp 6. Thus, it is impossible to mount and dismount the image reading unit 7 and fit and remove the fluorescent lamp 6 from the operative area located above the upper surface of the frame. Accordingly, mounting and dismounting operations as well as replacing operations are very troublesome and complicated to be performed.

Usually, the conventional image information reading apparatus is equipped with a cooling fan for the purpose of preventing excessive increase of temperature in the casing of the apparatus due to generation of heat from fluorescent lamp and other components. However, in the conventional apparatus the cooling fan is caused to rotate at a constant rotational speed during operation of the apparatus after electricity supply source is turned on. This leads to a problem that the cooling fan generates an increased magnitude of noisy sound during waiting state of the apparatus. To reduce generation of noisy sound during waiting state of the apparatus it is already proposed that the cooling fan has a reduced number of revolutions but this leads to another problem that the fluorescent lamp is excessively heated up to an elevated temperature during reading operation (during copying operation).

SUMMARY OF THE INVENTION

Thus, the present invention has been made with the foregoing problems in mind and its object resides in providing an image information apparatus which assures improved horizontal posture of an original holding board and simplified assembling operation of a frame.

Other object of the present invention is to provide an image information reading apparatus which assures that mounting and dismounting operations of the whole image reading unit as well as fitting and removing operations of a light source are performed in the simple manner.

Another object of the present invention is to provide an image information reading apparatus which assures that generation of excessively noisy sound and excessive increase of temperature during reading operation are inhibited reliably.

To accomplish the above objects there is proposed according to the present invention, an image information reading apparatus essentially comprising an original holding board on which an original to be read is placed, an image reading unit including a light source section comprising a tubular light source adapted to emit light beam therefrom for the purpose of lightening the original placed on the original holding board, an optical system by way of which light beam reflected from the original on the original holding board is transmitted and photoelectric converting means adapted to receive light beam transmitted from the optical system and then carry out photoelectric converting with thus received light beam, each of the light source, the optical system and the photoelectric converting means being carried by means of a carriage member, guiding means for supporting the image reading unit while guiding reciprocatable movement of the image reading unit, driving means for reciprocatably driving the image reading unit in parallel with the original holding board, and a box-shaped frame in which the reciprocatably movable image reading unit, the guiding means and the driving means are accommodated, the frame including both side frames and an upper frame extending in the direction of movement of the image reading unit, the side frames and the upper frame being formed in the integral structure by bending a single sheet material and the upper frame being formed with a rectangular opening on which the original holding board is immovably placed.

Owing to the structure of the apparatus as described above, it has advantageous features that the frame has an increased strength, the supporting portions for the original holding glass plate is easy to maintain the horizontal posture, assembling operations can be performed in the simple manner and adjusting operation for the focussed state of the optical system after completion of assembling operation can be minimized.

In a preferred embodiment of the invention length of the rectangular opening on the upper surface of the frame as measured in the direction of movement of the image reading unit is determined appreciably longer than width of the image reading unit as measured in the direction at a right angle relative to the direction movement of the image reading unit in order that mounting and dismounting of the image reading unit adapted to reciprocatably move in the area below the original holding board and including a tubular light source, an optical system and photoelectric converting means can be effected in the simple manner. Mounting and dismounting operations of the image reading unit are performed by way of the steps of turning it by an angle of 90 degrees in the horizontal direction in the frame and displacing it in the vertical direction through the rectangular opening, that is, the upper surface of the frame.

In another embodiment of the invention, the rectangular opening on the upper frame is formed with a pair of cutouts which are located opposite to one another as seen in the direction at a right angle relative to the direction of movement of the image reading unit in order that fitting and removing of the tubular light source in the image reading unit can be effected in the simple manner. Fitting and removing operations of the tubular light source are performed by displacing it in the vertical direction through the cutouts and the rectangular opening.

Other objects, features and advantages of the present invention will become readily apparent from reading of the following description which has been prepared in conjunction with the accompanying drawings.

BRIEF DESCRIPTION OF THE DRAWINGS

The accompanying drawings will be briefly described below.

FIG. 7 is a cross-sectional view of the apparatus taken in line A - A' in FIG. 6.

FIG. 8 is a cross-sectional view of the apparatus taken in line B - B' in FIG. 6.

DESCRIPTION OF THE PREFERRED EMBODIMENTS

Now, the present invention will be described in a greater detail hereunder with reference to the accompanying drawings which illustrate preferred embodiments thereof.

Figure 1:
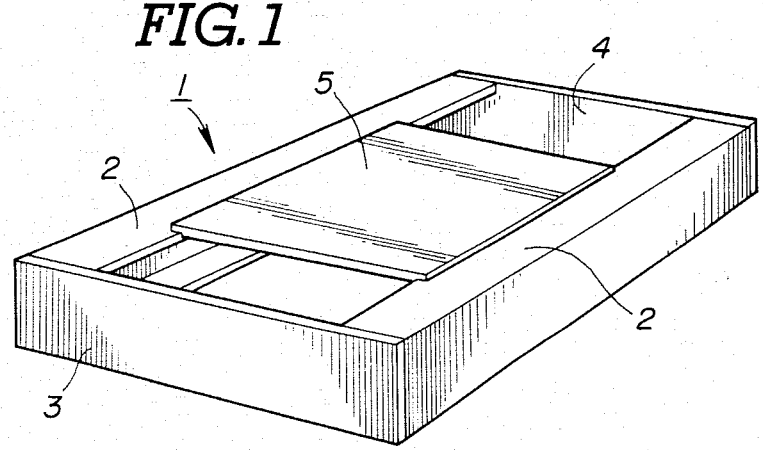
FIG. 1 is a perspective view schematically illustrating a conventional frame structure.
Figure 2:
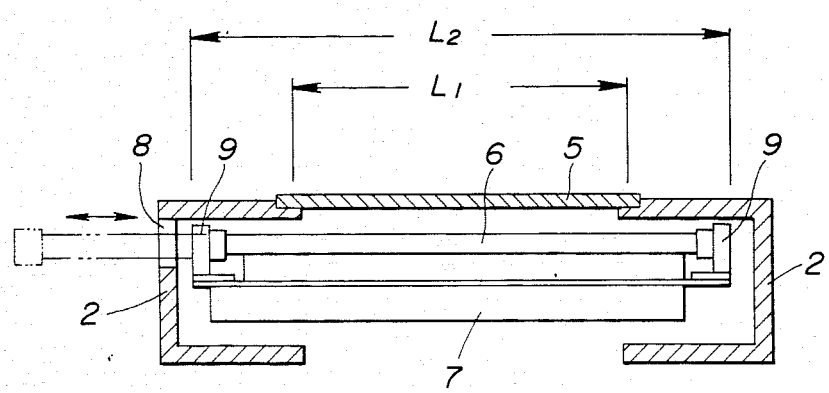
FIG. 2 is a cross-sectional view of the frame structure in FIG. 1, particularly illustrating how a conventional image reading unit is incorporated in the frame.
Figure 3:
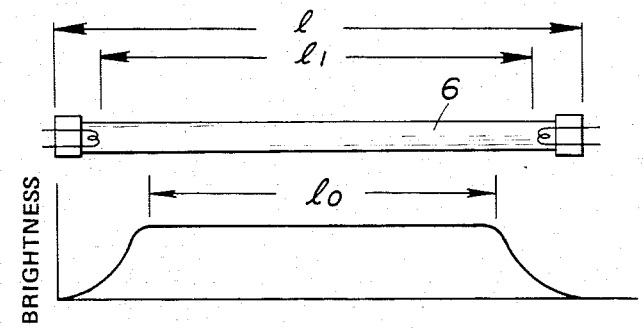
FIG. 3 is a side view of a light source in the form of a fluorescent lamp accompanied by a characteristic curve of the latter.
Figure 4:
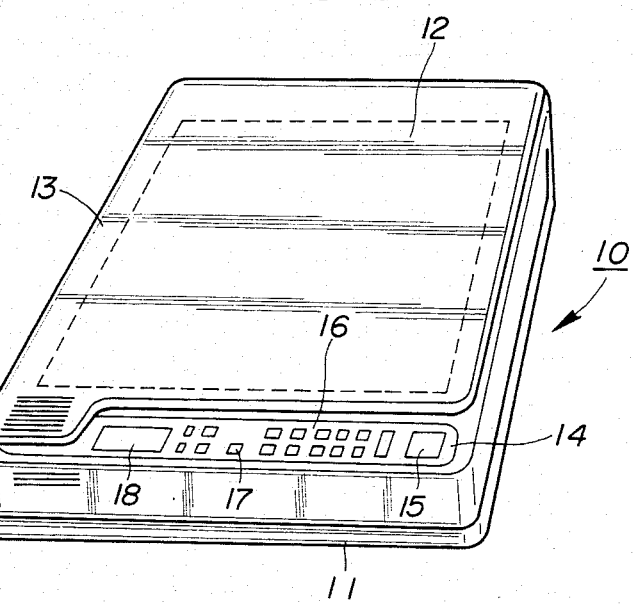
FIG. 4 is a perspective view of an image information reading apparatus in accordance with an embodiment of the invention.
Figure 5:
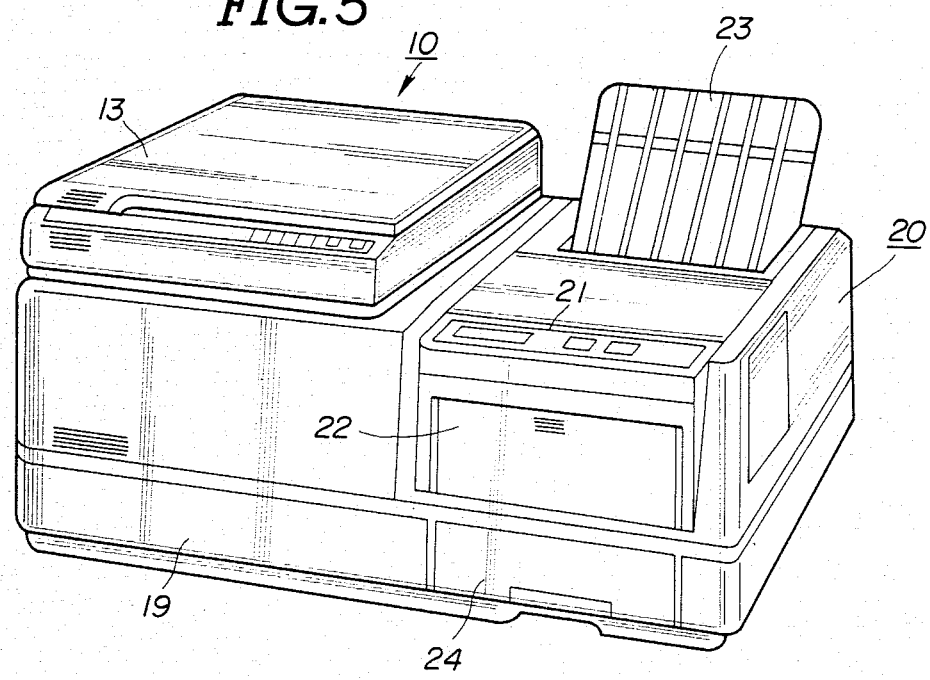
FIG. 5 is a persepctive view of a thermal transfer type color copying machine in which the image information reading appartus in FIG. 4 is incorporated.

FIG. 4 shows appearance of an image information reading apparatus 10 in accordance with an embodiment of the invention by way of perspective view and FIG. 5 shows a thermal transfer type color copying machine with the image information reading apparatus 10 of the invention mounted thereon by way of perspective view. In FIG. 4 reference numeral 11 designates a casing for the image information reading apparatus 10. An original holding board 12 (made of transparent glass) on which an original is to be placed in mounted on the upper surface of the casing 11 and an original cover 13 is openably secured to the one end of the original holding board 12. Specifically, the image information reading apparatus 20 is so constructed that an original placed on the original holding board 12 is optically scanned by reciprocatably displacing an image reading unit to be described in more details later in parallel with the bottom surface of the original holding board 12 and thereby image information on the original is read in the form of color signal of light beam. As is apparent from the drawing, a control panel 14 is arranged on the fore part of the casing 11. The control panel 14 is equipped with a copying key 15 for starting copying operation, ten keys 16 for determining the number of papers to be copied, a number display 17 for displaying the number of papers for which copying operation is completed and an operative state display 18 for displaying the existent state of various sections in the appartus.

Image information outputted from the image information reading apparatus 10 is transmitted to an image building section 20 which is detachably disposed on the upper right part of the casing 19 of the copying machine. Thereafter, image information transmitted from the image information reading apparatus 10 is converted to color information corresponding to ink on a strip of thermal transfer ink ribbon and a corresponding ink section on the thermal transfer ink ribbon is then selected in dependence on the thus transmitted color information whereby a plurality of colors are successively transferred to paper one by one by thermally transferring ink on the thus selected ink section to paper with the aid of a thermal head until required color copying is achieved. A control panel 21 is arranged on the fore part of the image building section 20. Further, the image building section 20 is provided with a manual paper feeding board 22 on the front wall which is openably attached to the latter so as to manually feed paper thererthrough, whereas it is provided with a discharged paper tray 23 on the upper rear part thereof on which papers for which copying operation has been completed are deposited one above another. Further, a paper feeding cassette 14 in which a number of papers to be copied are stored in detachably accommodated in the casing 19 of the copying machine at the position located below the image building section 20.

Figure 6:
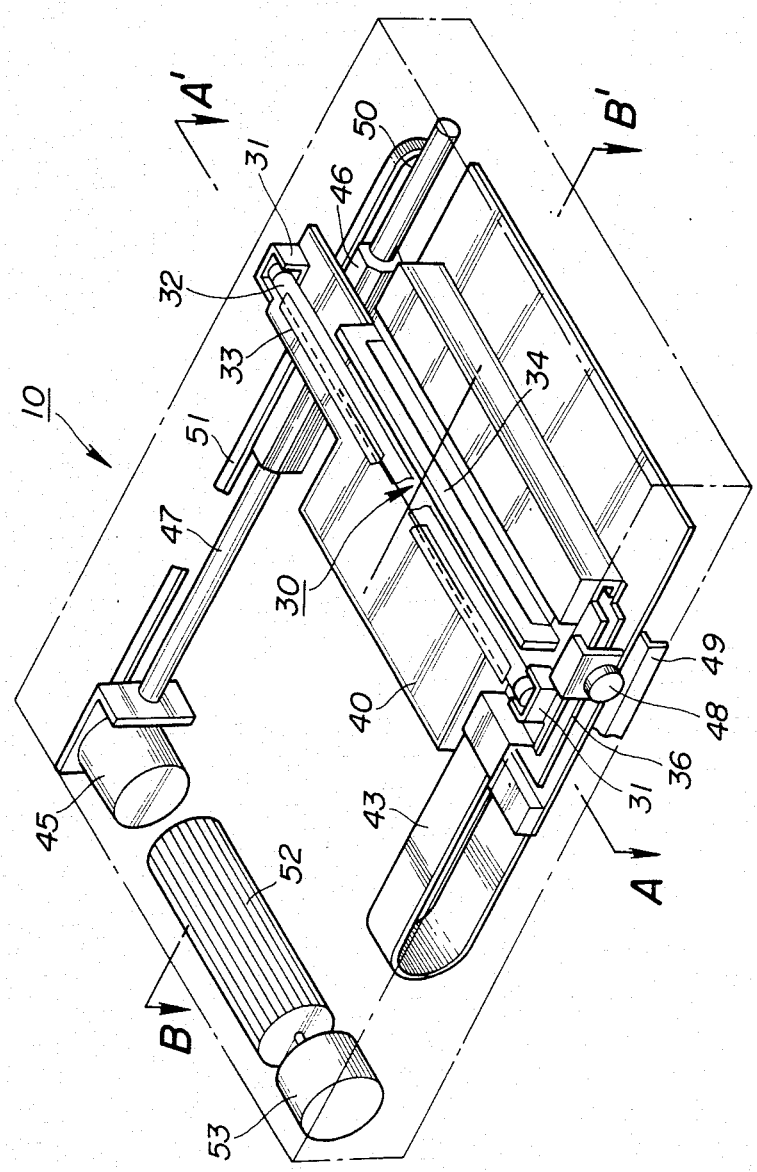
FIG. 6 is a perspective view of the appartus in FIG. 4, particularly illustrating how essential components are arranged in the apparatus.
Figure 9:
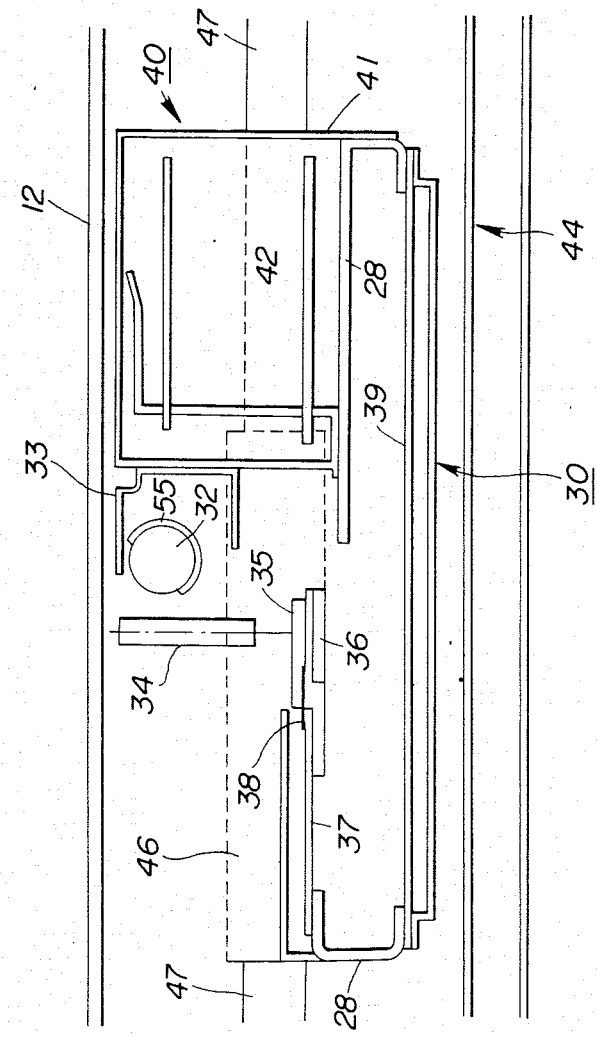
FIG. 9 is a fragmental sectional veiw of the apparatus particularly illustrating an image reading unit in an enlarged scale.

Next, FIGS. 6 to 9 illustrate one example of the inner structure of the image information reading apparatus 10, wherein FIG. 7 is a sectional view of the apparatus taken in line A - A' in FIG. 6, FIG. 8 is a sectional view of the apparatus taken in line B - B' in FIG. 6 and FIG. 9 is a fragmental view of FIG. 8 shown in an enlarged scale.

Referring to FIGS. 6 to 9, a transparent glass plate 12 serving as original holding board to hold an original thereon is fixedly secured to the upper surface of a box-shaped frame 26 which is covered with a cover case 25 in the upper area of the casing 10 of the apparatus and the frame is mounted on a platform 27.

The image reading unit 30 attached to a carriage 28 is disposed in the frame 26 to reciprocatably move from the front side to the rear side of the casing 10 and vice versa in the area located below the original holding glass plate 12. Specifically, the image reading unit 30 is supported by means of a pair of socket members 31 and includes a light source 32 in the form of a tube (fluorescent lamp) for lightening an original A placed on the original holding glass plate 12, a light scattering prevention plate 33 disposed in the proximity of the light source 32 in such a manner as to surround the latter, a lens 34 through which light beam reflexed from the original A which has been lightened by means of the light source is introduced in the downward direction, a photoelectric converting section 35 in the form of CCD type image sensor for carrying out of photo-optical conversion for light beam which has reached there through the lens 34, a sensor base board 36 on which the sensor 35 is replaceably mounted on a driver printed base board 37 (hereinafter referred to as driver base board) disposed adjacent to the sensor base board 36 (at the position located leftwards of the latter as seen in FIG. 9) to have a driving circuit for driving the image sensor 35, a driving power line and a signal output line incorporated therein. Each of the above-noted components is supported on the carriage 28 with the aid of suitable supporting members. It should be noted that both the sensor base board 36 and the driver base board 37 are disposed in the horizontal posture and the image sensor mounting surface of the sensor base board 36 and the component mounting surface of the driver base board 37 are oriented in the opposite direction to one another. The sensor base board 36 and the driver base board 37 are electrically connected to one another with the use of an electroconductive pin 38 bridged therebetween which is attached to them by soldering operation. The carriage 28 is designed in the hollow structure in which a signal processing printed circuit board 39 is accommodated in the horizontal posture. An amplifying circuit for amplifying output signal from the image sensor 35, A/D converting circuit for converting thus amplified signal to digital signal or the like circuits are incorporated in the signal processing printed circuit board 39.

Further, a power supply source unit 40 for feeding alternate electricity to the fluorescent lamp 32 is mounted on the carriage 28 at the rear part of the casing 10. As shown in more details in FIG. 9, the power supply source unit 40 is constituted by an accommodating box 41 made integral with the carriage 28 and an inverter printed circuit board 42 accommodated in the accommodating box 41 in the horizontal posture. The inverter printed circuit board 42 has an inverter circuit incorporated therein which serves to convert direct current electricity (for instance, DC 24 V) to alternate current electricity (for instance, AC 400 V). Signal outputted from the signal processing printed circuit board 39 is first transferred to CPU base board 44 on the bottom of the casing 10 via a flat cable 43 and it is then transferred further to the image building section 20. Further, an arrangement is made such that direct current electricity (for instance, DC 24 V) is fed also to the inverter printed circuit board 42 in the power supply source 40 via the flat cable 43. It should be noted that a driving circuit for the pulse motor 45, a line memory, a timing circuit for controlling input of signal, a high speed clock circuit, a central processing unit (hereinafter referred to as CPU) for carrying out total controlling and associated circuits are incorporated in the CPU base board 44.

The carriage 28 is so constructed that a slider 46 disposed at the one end thereof is slidably fitted onto a guide shaft 47 which extends in the longitudinal direction of the casing 10 and a wheel 48 rotatably supported at the other end thereof moves on a guide rail 49 which extends in parallel with the guide shaft 47. A driving pulley (not shown) is disposed at the one end of the guide shaft 47 (on the rear side of the casing 10) and a driven pulley 50 is disposed at the other end of the same (on the fore side of the casing 10) so that an endless timing belt 51 is spanned between the driving pulley and the driven pulley. It should be noted that a certain one point on the timing belt 51 is fixedly engaged to the carriage by way of suitable fixing means which is not shown in the drawings. The driving pulley is driven by means of a reversibly pulse motor 45 which is mounted at the rear part of the casing 10. When the pulse motor 45 is rotated in the normal direction of in the reverse direction, the carriage 28 (image reading unit 30) moves reciprocatably in parallel with the bottom surface of the original holding board 12 in the direction as identified by arrow marks (in the forward direction or in the rearward direction relative to the casing 10) whereby an original placed on the original holding board 12 is read.

As shown in FIG. 6, a cooling fan 52 is arranged at the position located in the vicinity of the pulse motor 45 at the rear part of the casing 10 in order to assure that the casing 10 and the image reading unit 30 are properly cooled in accordance with the conventional air suction method. During cooling operation outside air is sucked into the interior of the casing 10 through a number of suction holes (not shown) on the front wall of the casing 10, if flows around the carriage 28 and finally it is discharged to the outside through a number of discharge holes (not shown) on the rear wall of the casing 10. It should be added that the cooling fan 52 is driven by menas of a direct current brushless type motor 53.

Figure 10:
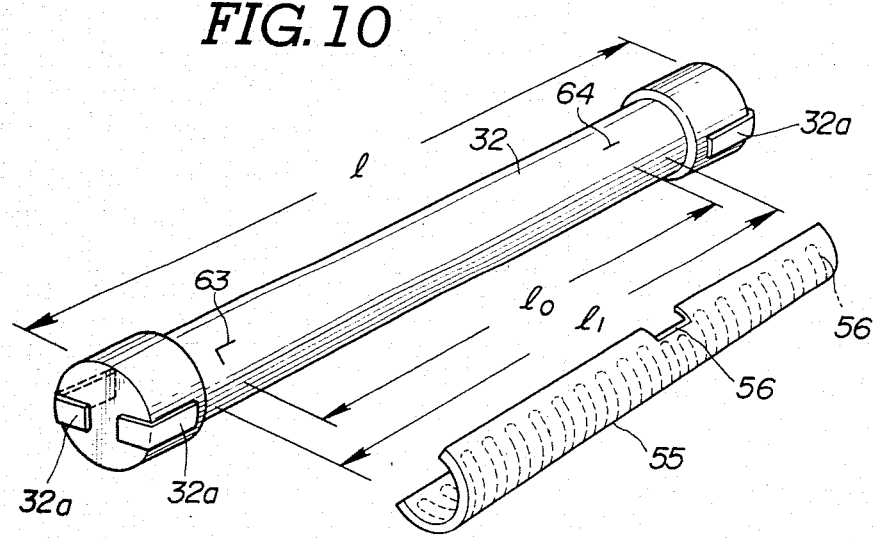
FIG. 10 is a perspective view of the combination of a light source and a heater for heating the latter, shown in the disassembled state.

As shown in FIG. 10, the image reading unit 30 is provided with a heater 55 in the area located in the proximity of the rear tubular wall surface of the light source 32. As will be apparent from the drawing, the heater 55 is so designed that it is molded of heat resistant plastic material such as polycarbonate or the like in the semicylindrical configuration with a snake-shaped heater wire 56 extending in the longitudinal direction embedded therein such a manner as to surround the light source 32 by an angular distance more than 180 degrees. Specifically, the inner diameter of the heater 56 is determined substantially same as the outer diameter of the light source 32 so as to allow the inner wall of the heater 56 to come in resilient contact with the tubular wall of the light source 32 and the effective surround area of the heater 56 as measured in the longitudinal direction of the light source 32 is so determined that its length is longer than the effective length $l_0$ of the light source 32 but shorter than the distance $l_1$ between both filaments of the light source 32 whereby the tubular wall of the light source 32 is maintained at a constant temperature (60° C. or lower or higher) at all time.

Figure 11:
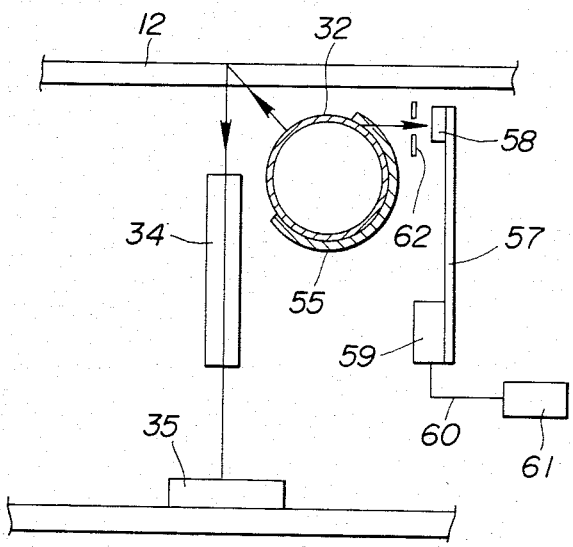
FIG. 11 is a fragmental sectional view of the image reading unit, particularly illustrating how the light beam intensity controlling system is constructed with the light source incorporated therein.

Further, the heater 55 is formed with a output 56 at the position located at the middle of the upper edge as seen in the longitudinal direction thereof. As shown in FIG. 11, light beam passing through the output 56 is received by a light beam detecting element 58 which is mounted on a printed board 57. Thus received light beam is amplified in the form of signal by a signal amplifying circuit 59 which is incorporated in the printed board 57 and thereafter thus amplified signal is transmitted to a light beam intensity controlling section 61 via a lead wire 60 whereby an intensity of electricity to be fed to the light source 32 is controlled automatically. Further, a slit 62 is disposed at the position located in front of the light beam detecting element 58 and behind the rear wall of the light source 32 in order to assure that only parallel light beam reaches the light beam detecting element 58 through the slit 62 at high accuracy.

As will be best seen in FIG. 10, "L-shaped" location mark 63 and "minus-shaped" location mark 64 are printed on the tube wall of the light source 32 at the position located outside the effective distant $l_0$ of the latter as seen in the longitudinal direction. The location marks 63 and 64 are intended to be in use for the purpose of determining datum points when the heater 55 is mounted on the tube wall of the light source 32. First, the position where the heater 55 is mounted on the light source 32 in the longitudinal direction is determined by means of the longitudinal part of the location mark 63 and the position of the heater 55 as seen in the peripheral direction is then determined by locating both the end edges of the heater 56 on the line extending through the lateral parts of the location marks 63 and 64.

Figure 12:
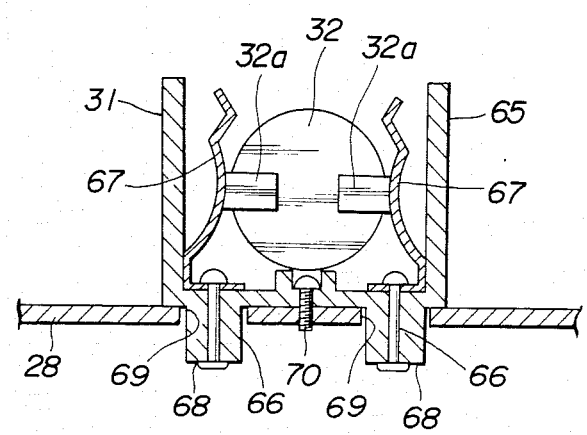
FIG. 12 is an enlarged vertical sectional view of a socket portion for supporting the light source.
Figure 13:
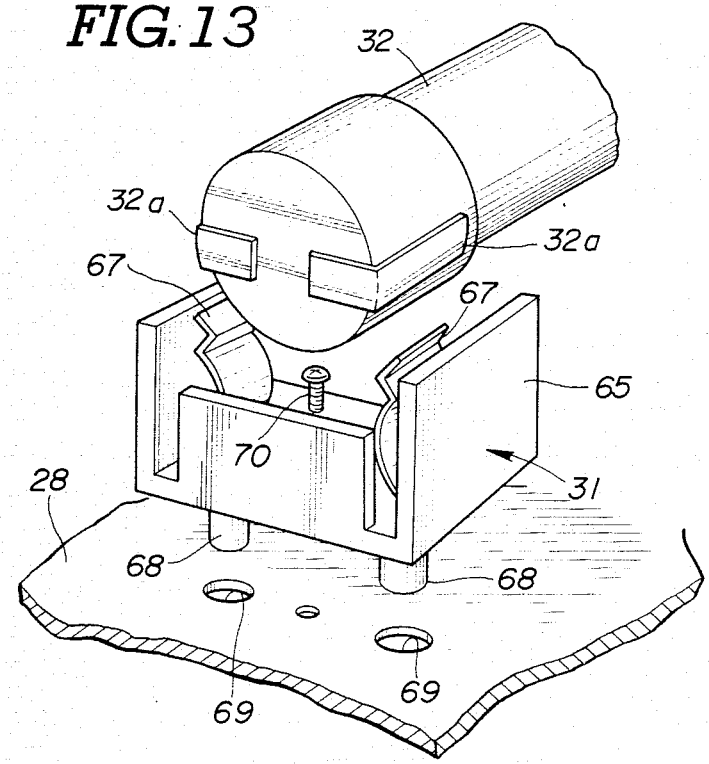
FIG. 13 is an enlarged perspective view of the socket portion in FIG. 12 with the light source removed therefrom.

Referring to FIGS. 12 and 13, a pair of bent contacts 32a are provided at both ends of the light source and they are held by means of a pair of socket members 31 which are fixedly mounted on the carriage plate 28. As shown in FIG. 12, each of the socket members 31 is constituted by a U-shaped socket housing 65 and a pair of electrodes 67 in the form of leaf spring which are fixedly secured to the bottom of the socket housing 65 with the use of pins 66 which are inserted therethrough and of which head part of subjected to caulking operation. A pair of electrode fixing bosses 68 are projected downwardly of the bottom surface of the socket housing 65 so as to allow the pins 66 to extend therethrough. Thus, fixing of the socket member 31 is achieved by way of the steps of fitting the bosses 68 into holes 69 on the carriage plate 28 and then tightening a single set screw 70. Owing to the arrangement made in that way it is assured that the light source 32 is removably held by means of the electrodes 67 by fitting it in the area as defined between both the electrodes 67.

Figure 14:
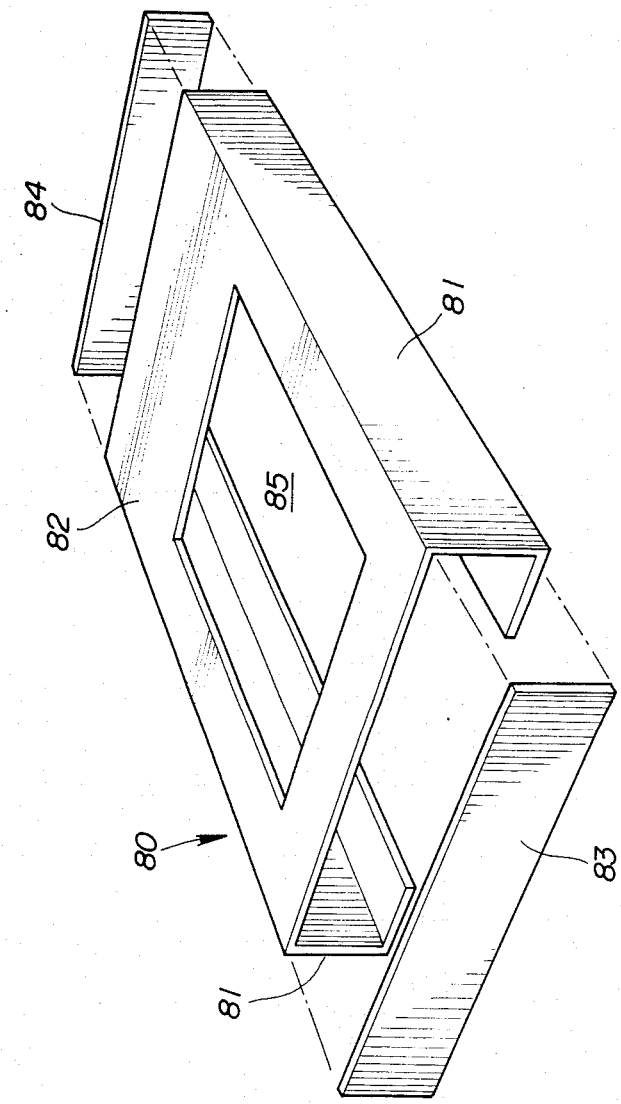
FIG. 14 is a perspective view of an example of a frame, particularly illustrating how the frame is built in the integral structure.
Figure 15:
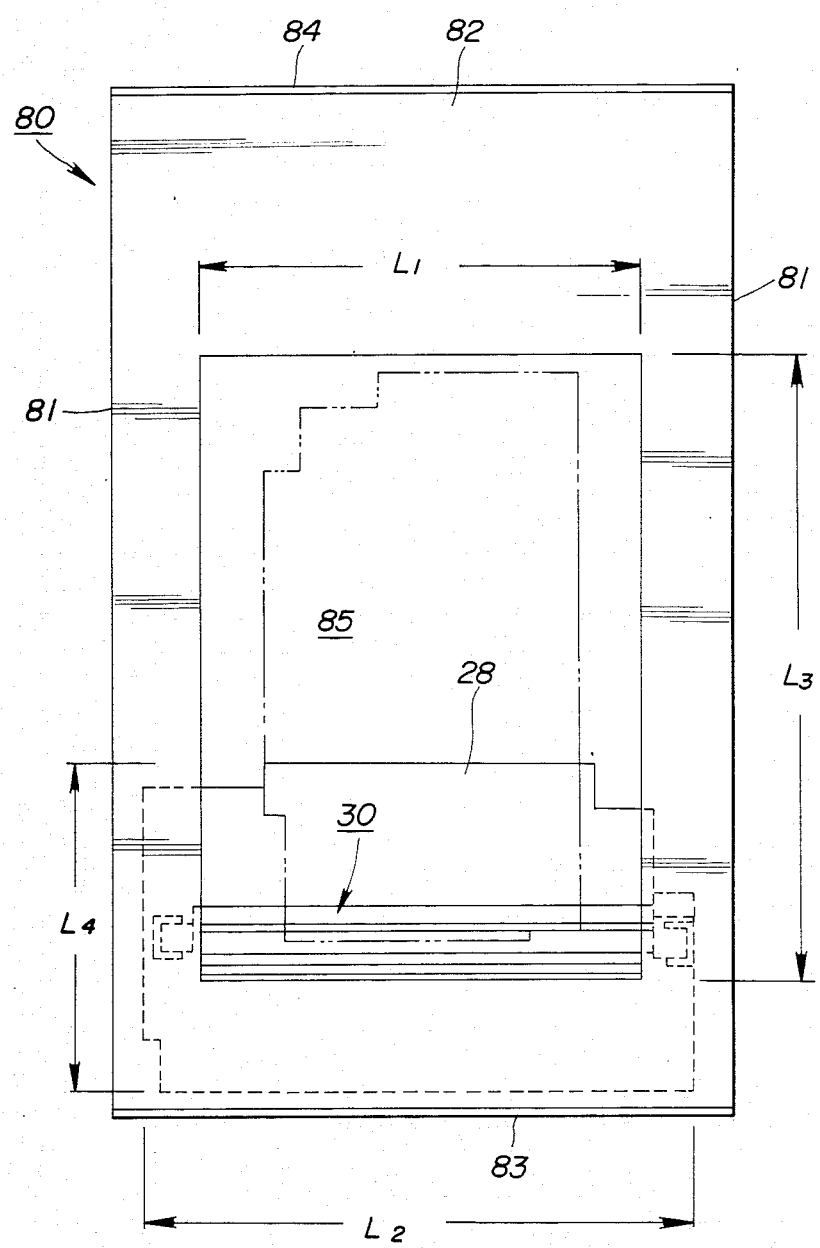
FIG. 15 is a plan view of the frame in FIG. 14.

In the illustrated embodiment a frame 80 constituting the casing 10 of the apparatus is made of a single steel plate having thickness of 1.6 mm which is bent in the inverted U-shaped cross-sectional configuration comprising both side frames 81 and an upper frame 82. The lower end part of each of the side frames 81 is bent further inwardly. In addition, a front frame 83 and a rear frame 84 are welded to the fore and rear end faces of the frame 80 whereby a required box-shaped frame structure is built, as shown in FIG. 14. As is apparent from the drawing, the upper frame 82 is formed with a rectangular opening 85 which serves to fixedly support the original holding glass board 12. As shown in FIG. 15, length $L_3$ of the rectangular opening 85 as measured in the direction of scanning operation is determined appreciably longer than width $L_2$ of the image reading unit 30 as measured in the direction at a right angle relative to the direction of scanning operation, whereas width $L_1$ of the rectangular opening 85 as measured in the direction at a right angle relative to the direction of scanning operation is determined appreciably longer than dimension $L_4$ of the image reading unit 30 as measured in the direction of scanning operation. Usually, the width $L_1$ of the rectangular opening 85 is determined longer than the dimension $L_4$ of the image reading unit 30, provided that the original holding board 12 is designed so as to read an original having A4 size. Since the apparatus is constructed in the above-described manner, mounting and dismounting of the image reading unit 30 can be achieved by way of the steps of turning it together with the carriage plate 28 in the horizontal direction by an angle of 90 degreees as represented by phantom lines and then displacing it through the rectangular opening 85 in the vertical direction.

Specifically, when the image reading unit 30 is to be removed from the interior of the frame 80 of the casing 10, the cover case 15 and the original holding glass board 12 are first disconnected, the guide shaft 47 serving to slidably hold the carriage plate 28 is drawn out of the casing 10 and the carriage plate 28 and the timing belt 51 are then removed therefrom. Next, the image reading unit 30 is turned together with the carriage plate 28 in the horizontal direction by an extent of half revolution in order to put the direction of the image reading unit 30 at a right angle relative to the direction of scanning operation thereof on the direction of scanning operation as seen from the upper surface of the frame. Now, the whole unit 30 is ready to be removed from the frame.

As will be readily apparent from the above description, it is possible to mount and dismount the image reading unit 30 moveably disposed within the interior of the frame 80 through the upper surface of the latter. This leads to advantageous features that mounting and dismounting of the image reading unit 30 can be achieved easily, maintaining and inspecting operations such as adjustment of the unit, replacement of the worn component with new one or the like can be performed simply and moreover the frame 80 has an increased strength due to the fact that it is built by a single steel plate in the integral structure.

Figure 16:
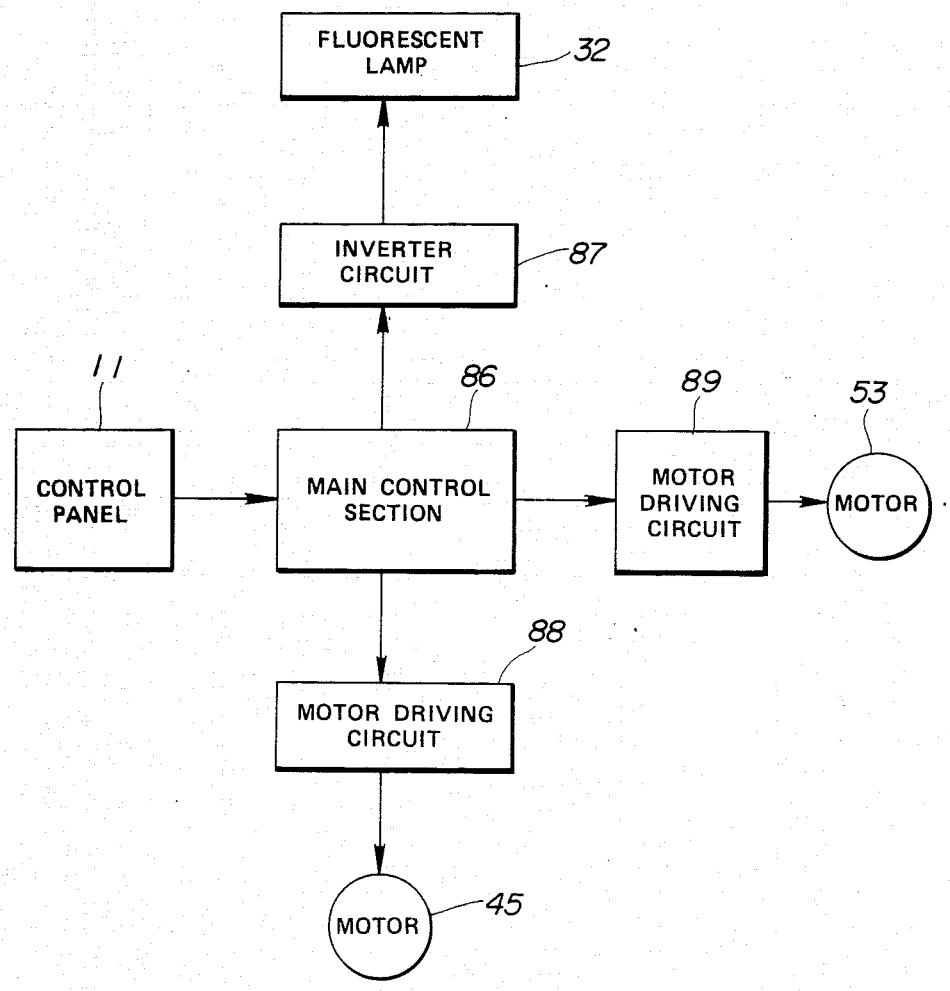
FIG. 16 is a block diagram schematically illustrating control circuits for the apparatus.

Next, FIG. 16 is a block diagram which schematically illustrates how the apparatus of the invention is controlled. In the drawing reference number 86 designates a main control section which undertakes total controlling operations for the whole apparatus. The main control section 86 includes CPU and its associated circuits as main components. The control panel 11 is electrically connected to the main control section 86, whereas the fluorescent lamp 32 is electrically connected to the same via the inverter circuit 87. Further, the motors 45 and 53 are electrically connected to the main control section 86 via the motor driving circuits 88 and 89.

Figure 17:
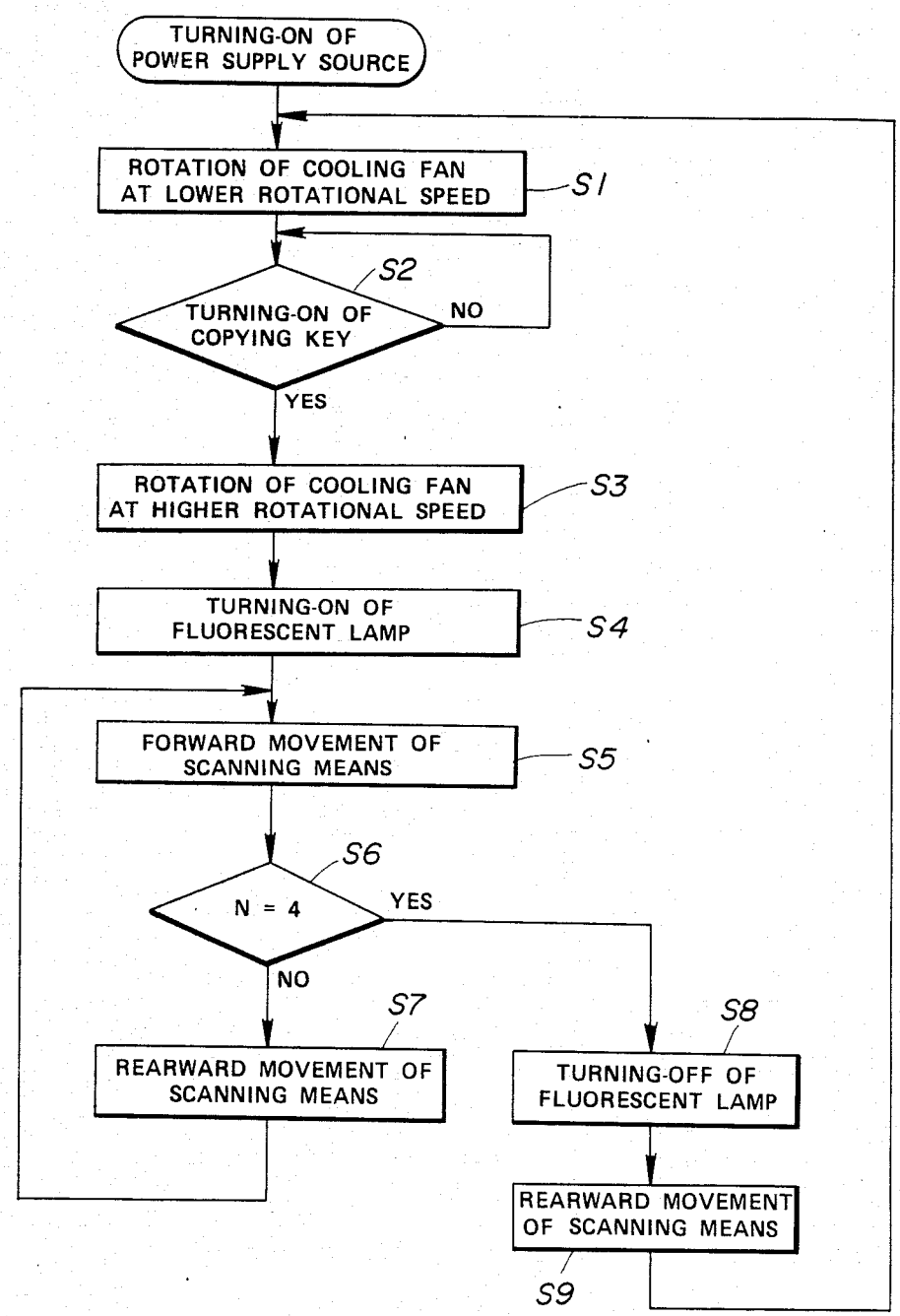
FIG. 17 is a flow chart schematically illustrating how operations of a cooling fan are controlled.

Next, description will be made below as to controlling operation of the cooling fan 52 with reference to FIG. 17 which is a flow chart illustrating the cooling system. When a power supply switch is turned on, a step S1 is reached to rotate the cooling fan 52 at a low rotational speed and thereafter a step S2 is reached. In the step S2 an operator waits until the copying key 15 is turned on. Once it has been turned on, a step S3 is reached. In the step S3 the cooling fan 52 is caused to rotate at a high rotational speed and thereafter a step S4 is reached. In the step S4 the fluorescent lamp 32 is turned on and thereafter a step S5 is reached. In the step S5 reading operation is initiated by displacing the image reading unit 30 in the forward direction and thereafter a step S6 is reached. In the step S6 it is discriminated whether the number of scanning operations of an original (that is, the number of forward movements of the image reading unit 30) N amounts to (4) or not. When it is found that it does not amount to (4), a step S7 is reached. In the step S7 the image reading unit 30 is caused to move in the backward direction until the step S5 is resumed to repeat the abovementioned operations. On the other hand, when it is found that the number of scanning operations amounts to (4), a step S8 is reached. In the step S8 the fluorescent lamp 32 is turned off and thereafter a step S9 is reached. In the step S9 the image reading unit 30 is caused to move in the backward direction until the step S1 is resumed to rotate the cooling fan 52 at a low rotational speed. Thus, the waiting state is restored. Incidentally, the reason why a single original is scanned by four times consists in that color copying is achieved in such a manner that color converting and transferring are effected for yellow component during first scanning operation, color converting and transferring are effected for magenta component during second scanning operation, color converting and transferring are effected for cyan component during third scanning operation and finally color converting and transferring are effected for back component during fourth scanning operation. In the case where monochromatic copying is achieved, the number of scanning operations N amounts only to (1).

Since the color system is constructed in the abovedescribed manner, the cooling fan 52 is caused to rotate at a low rotational speed when the fluorescent lamp 32 is turned off, whereas it is caused to rotate at a high rotational speed when it is turned on. As a result, generation of noisy sound during waiting state and increase of temperature during reading operation can be prevented effectively. Obviously, the fluorescent lamp 32 is a component which generates the largest amount of heat in the image information reading apparatus 10. For the reason there is a necessity for cooling the fluorescent lamp 32 in addition to cooling of the interior of the casing 10, because the fluorescent lamp 32 is fully turned on during reading operation (during copying operation). For the reason, by effecting cooling for the fluorescent lamp 32 with the aid of the cooling fan 52 which is caused to rotate at a high rotational speed when the fluorescent lamp 32 is turned on it is assured that excessive increase of temperature mainly due to the fluorescent lamp 32 is inhibited reliably. On the other hand, the same extent of cooling function as that during reading operation is not required during waiting state, because the fluorescent lamp 32 is turned off. If the cooling fan 52 is rotated during the waiting state at the same high rotational speed as during reading operation, it results that temperature on the tube wall of the fluorescent lamp 32 is lowered abnormally. This leads to problems that the fluorescent lamp generates an insufficient intensity of light beam at the time when it starts its lightening and moreover noisy sound is generated by rotation of the cooling fan. To obviate the foregoing problems the cooling fan 52 is rotated at lower rotational speed when the fluorescent lamp 32 is turned off.

Figure 18:
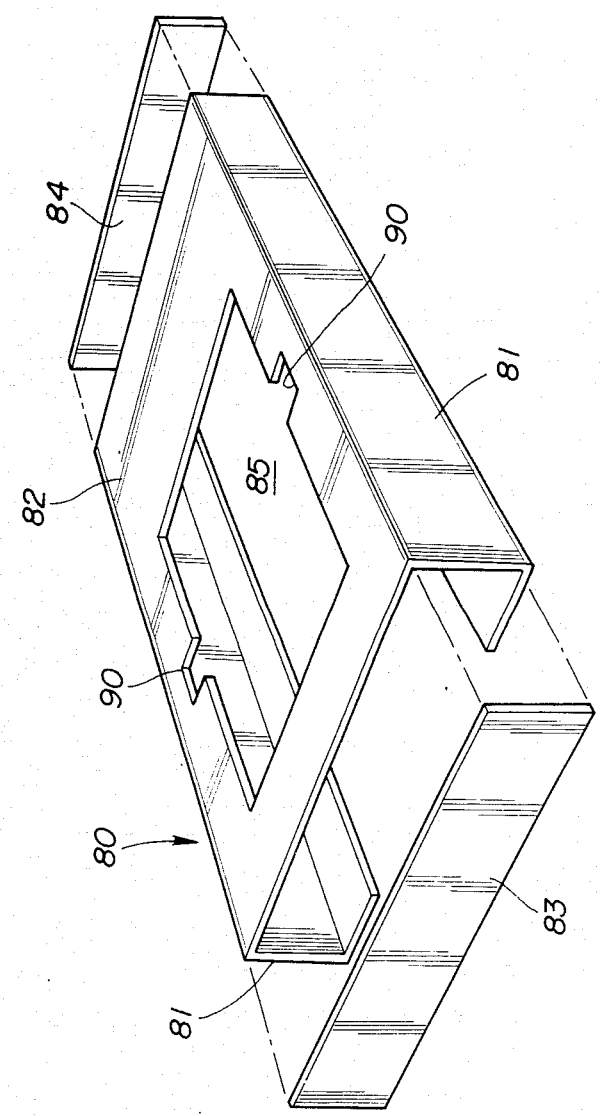
FIG. 18 is a perspective view of a frame for the apparatus in accordance with another embodiment of the invention.
Figure 19:
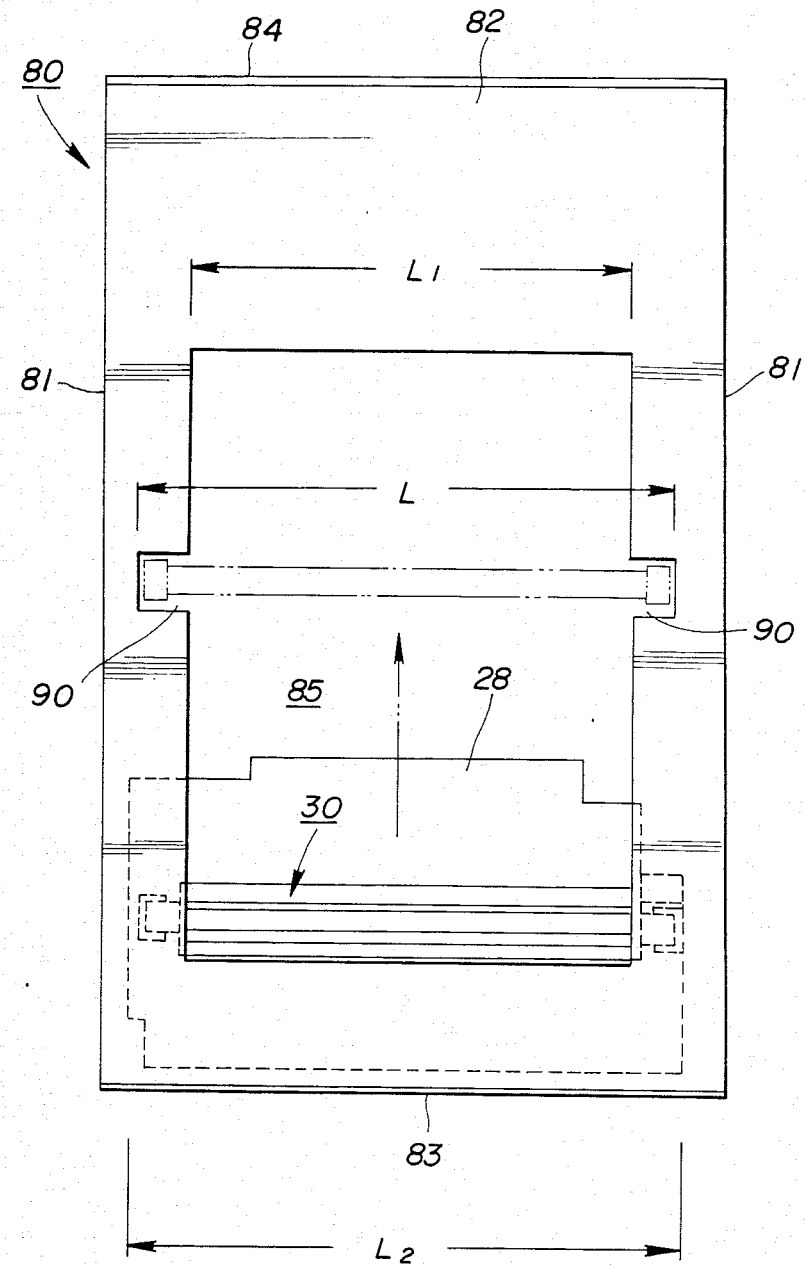
FIG. 19 is a plan view of the frame in FIG. 18.

Next, description will be made below as to the structure of a frame constituting the casing 10 of the apparatus in accordance with another embodiment of the invention with reference to FIGS. 18 and 19.

Also, in this embodiment the frame 80 is made of steel plate having a thickness of 1.6 mm which is bent in the inverted U-shaped configuration. Specifically, the frame 80 includes both side frames 82 and an upper frame 82 and a front frame 83 is welded to the fore end while a rear frame 84 is welded to the rear end of the frame 80 whereby a box-shaped frame structure is built. As is apparent from the drawings, the upper frame 82 is formed with a rectangular opening 85 on which the original holding glass plate 12 is immovably supported in the same manner as in the foregoing embodiment. In addition, the upper frame 82 is formed with cutouts 90 at the position located around at the middle parts of both the side edges of the rectangular opening 85 in the vicinity of both the side frames 81. Referring to FIG. 19, width L as measured between both the cutouts 90 is determined appreciably larger than the length l of the light source 32 in the image reading unit 30. When the light source 32 is to be removed from the latter, the cover case 25 and the original holding glass plate 12 are first removed and the image reading unit 30 is then displaced to the position where the light source 32 is located in vertical alignment with the cutouts 90 as represented by phantom lines in FIG. 19. Now, the light source 32 is ready to be removed through the cutout 90 from the upper surface of the frame 80 in the vertical direction. Obviously, when it is fitted into the image reading unit 30, operations are performed by way of the reverse steps to the foregoing ones.

Owing to the arrangement made in that way fitting and removing operations for the fluorescent lamp 32 are performed from the area located above the casing 10 of the apparatus and therefore the worn fluorescent lamp 32 can be easily replaced with new one.

While the present invention has been described above only with a few preferred embodiments thereof, it should of course be understood that it should not be limited only to them but various changes or modification may be made in any acceptable manner without departure from the spirit and scope of the invention.

For instance, the illustrated embodiments have been described as to the case where a fluorescent lamp is used as light source but the present invention should not be limited only to this. Alternatively, mercury-arc lamp or the like electric discharge lamp may be used in the quitely same manner.

Further, the illustrated embodiments have been described above as to the case where an image information reading apparatus is incorporated in a thermal transfer type color copying machine but the present invention should not be limited only to this. Alternatively, the apparatus of the invention may be incorporated in a printer in which monochromatic recording is effected, a printer for which other type of recording system is employed or the like printer.

What is claimed is:

1. A light source device for use in an image information reading apparatus comprising:

a tubular light source for emitting light into an original placed on an original holding board, each end portion of said light source is provided with a pair of plate-shaped contacts disposed on opposing sides of a peripheral surface of said end portion; and a pair of socket members for detachably supporting said light source at said end portions such that said light source is detachable from said socket members in a vertical direction without rotating said light source about an axis thereof, each of said socket members comprising a pair of opposing electrodes comprising leaf springs for clamping therebetween said light source in a horizontal direction while contacting with said pair of contacts, and socket housing for covering said pair of electrodes, said housing being secured to a supporting member and opened at an upper portion.

2. A light source device according to claim 1, wherein said pair of contacts respectively comprises an L-shaped plate member whose inner surface is brought into abutment with said peripheral surface of the end portion and an end surface of said light source.

3. A light source device according to claim 1, wherein said supporting member comprises a carriage member which moves according to scanning of the original.

4. A light source device according to claim 1, wherein said leaf spring has an inwardly convexed surface.

5. A light source device according to claim 1, wherein said socket housing is provided on the bottom thereof with a convex portion for carrying said light source.

6. A light source device according to claim 1, wherein said supporting member is provided with a pair of holes and said socket housing is provided on the bottom thereof with a pair of bosses for engaging with said pair of holes, whereby positioning of said socket members is carried out by engaging said pair of bosses with said pair of holes.

7. A light source device according to claim 1, wherein said pair of electrodes is respectively secured to the bottom of said socket housing by means of a pin.

8. A light source device according to claim 1, wherein said supporting member is provided with a pair of holes and said socket housing is provided on the bottom thereof with a pair of bosses for engaging with said pair of holes, whereby positioning of said socket members is carried out by engaging said pair of bosses with said pair of holes, and wherein said pair of electrodes are respectively pinconnected to the bottom of said socket housing at said bosses.

9. A light source device according to claim 1, wherein said socket housing is secured to said supporting member by means of a screw.

10. A light source device according to claim 6, wherein said socket housing is secured to said supporting member by means of a screw.

11. A light source device according to claim 1, wherein said tubular light source comprises a fluorescent lamp.

12. An image information reading apparatus comprising:

an original holding board on which an original is to be read is placed;

an image reading unit including a light source section comprising a tubular light source for emitting light onto an original placed on an original holding board, each end portion of said light source is provided with a pair of plate-shaped contacts disposed on opposing sides on a peripheral surface of said end portion, a pair of socket members for detachably supporting said light source at said end portions such that said light source is detachable from said socket members in a vertical direction without rotating said light source about an axis thereof, each of said socket members comprising a pair of opposing electrodes comprising leaf springs for clamping therebetween said light source in a horizontal direction while contacting with said pair of contacts, a socket housing for covering said pair of electrodes, said housing being secured to a supporting members opened at an upper portion; an optical system by way of which a light beam reflected from the original on the original holding board is transmitted, and photoelectric converting means adapted to receive the light beam transmitted from said optical system and then carry out photoelectric converting with the received light beam, each of said light source section, said optical system and said photoelectric converting means being carried by means of a carriage member:

guiding means for supporting said image reading unit while guiding reciprocatable movement of the image reading unit;

driving means for reciprocatably driving the image reading unit in parallel with the original holding board; and a box-shaped frame in which said reciprocatably movable image reading unit, said guiding means and said driving means are accommodated, said frame including both side frames and an upper frame extending in the direction of movement of image reading unit, said side frames and said upper frame being formed in the integral structure by bending a single sheet material and said upper frame being formed with a rectangular opening on which the original holding board is immovably placed, wherein the rectangular opening on the upper frame is formed with a pair of cutouts which are located opposite to one another as seen in the direction at a right angle relative to the direction of movement of the image reading unit and wherein fitting and removing of the tubular light source can be achieved by displacing it in the vertical direction through the cutouts and the rectangular opening.

13. An image information reading apparatus according to claim 12, further comprising a cooling fan for generating flow of cooling air which is directed toward the image reading unit, said cooling fan including controlling means for operating said fan at a lower rotational speed when the light source is turned off and at a higher rotational speed when the light source is turned on, wherein said cooling fan intakes air through an intake opening provided on a first side face of a casing of the apparatus, the first side face being provided perpendicular to the direction of movement of the image reading unit, and exhausting the air through an exhaust opening provided on a second side face of the apparatus, said second side face opposing said first side face so as to move the air along the direction of movement of the image reading unit.

* * * * *